United States Patent [19]

Drew

[11] 4,038,964
[45] Aug. 2, 1977

[54] PARABOLIC SOLAR CONCENTRATOR EMPLOYING FLAT PLATE COLLECTOR

[76] Inventor: George F. Drew, 1113 - 28th St., NW., Winter Haven, Fla. 33880

[21] Appl. No.: 599,183

[22] Filed: July 25, 1975

[51] Int. Cl.² .................................................. F24J 3/02
[52] U.S. Cl. ........................................ 126/270; 126/271
[58] Field of Search ................. 126/270, 271; 237/1 A

[56] References Cited

U.S. PATENT DOCUMENTS

| | | | |
|---|---|---|---|
| 1,424,932 | 8/1922 | Moreau | 126/271 |
| 1,575,309 | 3/1926 | Anderson | 126/271 |
| 3,321,012 | 5/1967 | Hervey | 126/271 |
| 3,847,136 | 11/1974 | Salvail | 126/271 |
| 3,923,039 | 12/1975 | Falbel | 126/271 |

*Primary Examiner*—Kenneth W. Sprague
*Attorney, Agent, or Firm*—Duckworth, Hobby, Orman, Allen & Pettis

[57] ABSTRACT

A combined solar energy collector includes a trough having a generally parabolic cross section, the trough having a reflective inner surface adapted to receive and reflect direct and indirect solar radiation. A flat plate solar collector extends along the apex line of the parabolic cross section, the flat plate collector having means therein defining a circuitous path for a fluid passing therethrough. Means, such as a glass enclosure surrounding the flat plate collector, admits shortwave solar radiation into the flat plate collector and reduces longwave heat reradiation therefrom.

7 Claims, 2 Drawing Figures

PARABOLIC SOLAR CONCENTRATOR EMPLOYING FLAT PLATE COLLECTOR

BACKGROUND OF THE INVENTION

1. Field of the Invention

The present invention relates to solar energy devices, and in particular relates to solar energy collectors adapted to combine the ability of curved reflectors to concentrate direct and indirect solar radiation and the ability of a flat plate collector to absorb and utilize direct and indirect solar radiation.

2. Description of the Prior Art

A wide variety of solar energy collecting devices are known in the prior art. Generally, solar collectors are of two types. The first type comprises collectors having curved surfaces which are adapted to concentrate the solar energy radiating directly on the reflective surface thereof. Such arrangements include parabolic and hemispherical dishes. In most of these curved dish arrangements, the substance to be heated is passed through the focal point of the curved, reflecting surface. Since indirect solar radiation is not reflected onto the focal point in such curved reflectors, it is common to employ means for moving the curved dish so as to track the sun during the solar day, in order to receive solar radiation directly onto the reflective surface. An arrangement of this type is disclosed in U.S. Pat. No. 1,424,932 to Moreau.

A second type of solar collector is generally referred to as a flat plate collector, because the collecting element is disposed along a flat surface. Such flat plate collectors are capable of absorbing both direct and indirect solar radiation, but are not capable of reaching the high temperatures which characterize the operation of the curved dish collectors. Examples of flat plate collectors are found in the following U.S. Pat. Nos. 3,599,626 to Bouse et al.; 3,464,402 to Collura; 3,390,672 to Snelling; 3,299,881 to Kotch; 3,039,453 to Andrassy; 3,022,781 to Andrassy; 2,838,043 to Bliss; and 2,316,191 to Scott.

In U.S. Pat. No. 3,321,012, Hervey discloses a trough reflector having a semi-circular cross section, with a flat plate collector disposed on the apex line thereof. As disclosed by Hervey, this arrangement is capable of absorbing both direct and indirect solar radiation, since indirect radiation is reflected off of the reflective surface and against the flat plate collector. The flat plate collector disclosed by Hervey comprises a single, flat tube extending along the apex line through the trough, and through which water flows in order to absorb the heat energy generated by solar radiation.

Other prior art references of interest include the following U.S. Pat. Nos. 2,770,229 to Tarcici; 3,023,257 to Fritts; 3,038,463 to Daymon; 2,859,745 to Brudersdorff; 2,690,463 to Clevett et al. 3,130,074 to Loring; 2,994,318 to Lee; 3,295,512 to McCusker; and 3,310,102 to Trombe. Additional prior art references may be found in Patent Office class 126, subclass 270; class 60, subclass 641; class 136, subclass 206; and class 165, subclass 40, among others.

SUMMARY OF THE INVENTION

The present invention contemplates a combined solar energy concentrator and collector comprising a trough having a generally parabolic cross section, the trough having a reflective inner surface adapted to receive and reflect direct and indirect solar radiation. A flat plate solar collector extends generally along the apex line of the parabolic cross section, the flat plate collector having means therein defining a circuitous path for a fluid passing therethrough. Selective means are provided for admitting shortwave solar radiation into the flat plate collector and reducing longwave heat reradiation therefrom.

In a preferred embodiment, the top of the trough is covered with a material which is transparent to solar radiation, and which likewise reduces longwave heat radiation from the interior of the trough.

THE DRAWING

DETAILED DESCRIPTION

A preferred embodiment of apparatus in accordance with the present invention will now be described with reference to FIGS. 1 and 2.

Figure 1:
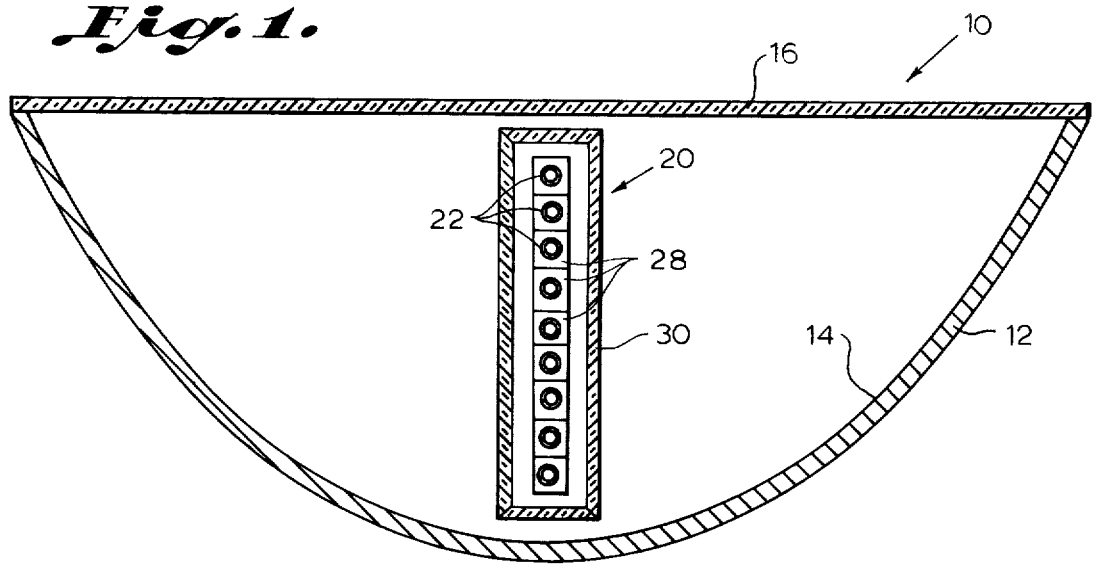
FIG. 1 is a cross section of one embodiment of a solar collector in accordance with the present invention.

Referring first to FIG. 1, the solar collector, referred to generally as 10, comprises a parabolic trough 12 having an inner reflective surface 14. The parabolic trough 12 is preferably formed of a material with an inner reflective surface. Although the dimensions of the parabola are not critical, it has been found that a dimensional ratio between 1:4.4 to 1:9, and preferably 1:6.5 between the distance from the apex to the focal line and the side extremities of the trough 12, and 1:2.75 between the height of the focal plane and the side extremities is suitable for the best utilization and concentration of incident solar radiation, as well as direct solar radiation.

A cover 16 extends over the parabolic trough 12 between the extremities thereof. The cover 16 may comprise a sheet of glass or other material which selectively admits shortwave solar radiation and blocks or reduces the retransmission of longwave heat radiation from within the enclosure defined by the cover 16 and the trough 12. Although not shown, it will be understood that the ends of the trough 12 usually are enclosed by side members (not shown).

Figure 2:
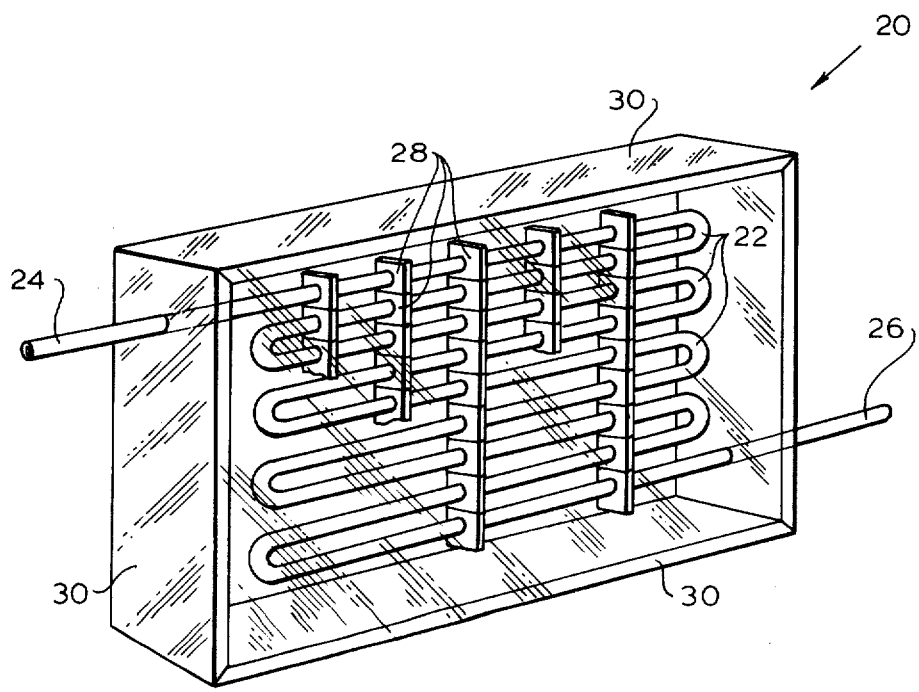
FIG. 2 is a perspective side view of a portion of the apparatus shown in FIG. 1.

Referring now to both FIGS. 1 and 2, a flat plate collector 20 is positioned along the apex line of the parabolic trough 12. The flat plate collector includes a circuitous tubing having parallel portions 22 serially joined together, the parallel portions extending in the plane defined by the apex line across the trough 12. An inlet line 26 is provided coupled to the circuitous tubing defined by the parallel portions 22, with an outlet 24 also provided. Heat absorbing fins 28 or other means of heat transfer are positioned along or in contact with the parallel disposed tubular portions 22, so as to absorb the incident solar radiation and heat a fluid passing through the tubing 22. The entire flat plate collector 20 is enclosed with an enclosure 30, of glass or other material, or coated with or composed of a material which is adapted to admit shortwave solar radiation, but to block or reduce longwave heat radiation from the confines of the enclosure. It is preferred to effect a partial vacuum within the enclosure 12.

In use, the combined solar collector 10 provides a much more efficient device throughout the entire solar day, than a parabolic collector or a flat plate collector used alone. It has been found from experimentation that combined direct and indirect solar radiation reflected from the parabolic trough 12 forms a heat "envelope"

about the flat plate collector 20, so as to substantially increase the efficiency thereof. Further, both direct and indirect solar radiation falling on the reflective surface 14 of the parabolic trough 12 is reflected and concentrated onto portions of the flat plate collector 20. As a result, the solar collector 10 is capable of developing and sustaining higher temperatures during periods of reduced solar radiation than either a parabolic reflector or a flat plate collector used alone. The arrangement of the component parts described in the embodiment permits concentration of substantial portions of available indirect radiation as well as all direct solar radiation which falls on its area, thereby achieving higher efficiencies and higher temperatures both under optimum solar radiation conditions and under reduced solar radiations conditions. Thus, the device receives both direct and indirect radiation from the sky as a flat plate collector does, and concentrates both direct and indirect radiation as a focusing device.

I claim:

1. A solar energy and concentrator collector comprising:
    a trough having a generally parabolic cross section, said trough having a reflective inner surface adapted to receive and reflect direct and indirect solar radiation;
    a flat plate solar collector extending along the apex line of said parabolic cross section, said flat plate collector having means therein defining a circuitous path for a fluid passing therethrough;
    selective means for admitting shortwave solar radiation into said flat plate collector and reducing longwave heat radiation from said flat plate collector; and wherein
    the ratio of the dimensions from the apex to the focal line of said trough to the dimension between the extremities of said trough is approximately in a range between 1:5 to 1:9.

2. The solar energy collector and concentrator recited in claim 1 further comprising a cover transparent to solar radiation positioned between the extremities of said reflective surface so as to create a "greenhouse" effect between said cover and said reflective surface.

3. The solar energy collector and concentrator recited in claim 2 wherein said circuitous path means comprises a circuitous tubing having portions serially joined together, said portions extending in the plane of said apex line along said trough.

4. The solar energy collector and concentrator recited in claim 2 wherein said selective means comprises a glass enclosure surrounding said flat plate collector.

5. The solar energy collector and concentrator recited in claim 4 further comprising means for defining at least a partial vacuum between said enclosure and said flat plate collector.

6. The solar energy collector and concentrator recited in claim 1, wherein said ratio is 1:6.5.

7. The solar energy collector and concentrator recited in claim 1 wherein the ratio of the length of the focal plane to the dimension between the extremities of said trough is about 1:2.75.

* * * * *